United States Patent
Craft et al.

(10) Patent No.: US 7,620,726 B2
(45) Date of Patent: *Nov. 17, 2009

(54) ZERO COPY METHOD FOR RECEIVING DATA BY A NETWORK INTERFACE

(75) Inventors: Peter K. Craft, San Francisco, CA (US); Clive M. Philbrick, San Jose, CA (US); Laurence B. Boucher, Saratoga, CA (US); David A. Higgen, Saratoga, CA (US)

(73) Assignee: Alacritech, Inc., San Jose, CA (US)

( * ) Notice: Subject to any disclaimer, the term of this patent is extended or adjusted under 35 U.S.C. 154(b) by 1074 days.

This patent is subject to a terminal disclaimer.

(21) Appl. No.: 11/046,337

(22) Filed: Jan. 28, 2005

(65) Prior Publication Data
US 2005/0198198 A1      Sep. 8, 2005

Related U.S. Application Data (63) Continuation of application No. 10/706,398, filed on Nov. 12, 2003, now Pat. No. 6,941,386, and a continuation of application No. 10/208,093, filed on Jul. 29, 2002, now Pat. No. 6,697,868, and a continuation-in-part of application No. 09/514,425, filed on Feb. 28, 2000, now Pat. No. 6,427,171, and a continuation-in-part of application No. 09/141,713, filed on Aug. 28, 1998, now Pat. No. 6,389,479, said application No. 09/514,425 is a continuation-in-part of application No. 09/067,544, filed on Apr. 27, 1998, now Pat. No. 6,226,680, and a continuation-in-part of application No. 09/384,792, filed on Aug. 27, 1999, now Pat. No. 6,434,620, said application No. 10/208,093 is a continuation-in-part of application No. 09/464,283, filed on Dec. 15, 1999, now Pat. No. 6,427,173, which is a continuation-in-part of application No. 09/439,603, filed on Nov. 12, 1999, now Pat. No. 6,247,060, which is a continuation-in-part of application No. 09/067,544.

(60) Provisional application No. 60/098,296, filed on Aug. 27, 1998, provisional application No. 60/061,809, filed on Oct. 14, 1997.

(51) Int. Cl.
*G06F 15/16* (2006.01)
*G06F 12/00* (2006.01)
(52) U.S. Cl. .................................. 709/230; 709/250
(58) Field of Classification Search .............. 709/203, 709/223–229, 230, 245, 250
See application file for complete search history.

(56) References Cited

U.S. PATENT DOCUMENTS 4,366,538 A    12/1982    Johnson et al. ............. 364/200

(Continued)

FOREIGN PATENT DOCUMENTS

WO    WO 98/50852    11/1998

(Continued)

OTHER PUBLICATIONS

Internet pages entitled "Hardware Assisted Protocol Processing", (which Eugene Feinber is working on), 1 page, printed Nov. 25, 1998.

(Continued)

*Primary Examiner*—Zarni Maung
(74) *Attorney, Agent, or Firm*—Mark Lauer; Silicon Edge Law Group LLP (57) ABSTRACT

A host CPU runs a network protocol processing stack that provides instructions not only to process network messages but also to allocate processing of certain network messages to a specialized network communication device, offloading some of the most time consuming protocol processing from the host CPU to the network communication device. By allocating common and time consuming network processes to the device, while retaining the ability to handle less time intensive and more varied processing on the host stack, the network communication device can be relatively simple and cost effective. The host CPU, operating according to instructions from the stack, and the network communication device together determine whether and to what extent a given message is processed by the host CPU or by the network communication device.

25 Claims, 4 Drawing Sheets

U.S. PATENT DOCUMENTS

| | | | |
|---|---|---|---|
| 4,485,455 A | 11/1984 | Boone et al. | 364/900 |
| 4,485,460 A | 11/1984 | Stambaugh | 365/203 |
| 4,589,063 A | 5/1986 | Shah et al. | 710/8 |
| 4,700,185 A | 10/1987 | Balph et al. | 340/825.5 |
| 4,991,133 A | 2/1991 | Davis et al. | 364/900 |
| 5,056,058 A | 10/1991 | Hirata et al. | 709/230 |
| 5,058,110 A | 10/1991 | Beach et al. | 370/85.6 |
| 5,097,442 A | 3/1992 | Ward et al. | 365/78 |
| 5,163,131 A | 11/1992 | Row et al. | 395/200 |
| 5,212,778 A | 5/1993 | Dally et al. | 395/400 |
| 5,280,477 A | 1/1994 | Trapp | 370/85.1 |
| 5,289,580 A | 2/1994 | Latif et al. | 395/275 |
| 5,303,344 A | 4/1994 | Yokoyama et al. | 395/200 |
| 5,412,782 A | 5/1995 | Hausman et al. | 395/250 |
| 5,418,912 A | 5/1995 | Christenson | 395/200 |
| 5,448,566 A | 9/1995 | Richter et al. | 370/94.1 |
| 5,485,579 A | 1/1996 | Hitz et al. | 395/200.12 |
| 5,506,966 A | 4/1996 | Ban | 395/250 |
| 5,511,169 A | 4/1996 | Suda | 395/280 |
| 5,517,668 A | 5/1996 | Szwerinski et al. | 395/800 |
| 5,524,250 A | 6/1996 | Chesson et al. | 395/775 |
| 5,535,375 A | 7/1996 | Eshel et al. | 391/500 |
| 5,548,730 A | 8/1996 | Young et al. | 395/280 |
| 5,566,170 A | 10/1996 | Bakke et al. | 370/60 |
| 5,574,919 A | 11/1996 | Netravali et al. | 395/561 |
| 5,588,121 A | 12/1996 | Reddin et al. | 395/200.15 |
| 5,590,328 A | 12/1996 | Seno et al. | 395/675 |
| 5,592,622 A | 1/1997 | Isfeld et al. | 395/200.02 |
| 5,598,410 A | 1/1997 | Stone | 370/469 |
| 5,619,650 A | 4/1997 | Bach et al. | 395/200.01 |
| 5,629,933 A | 5/1997 | Delp et al. | 370/411 |
| 5,633,780 A | 5/1997 | Cronin et al. | 361/220 |
| 5,634,099 A | 5/1997 | Andrews et al. | 395/200.07 |
| 5,634,127 A | 5/1997 | Cloud et al. | 395/680 |
| 5,642,482 A | 6/1997 | Pardillos | 395/200.2 |
| 5,664,114 A | 9/1997 | Krech, Jr. et al. | 395/200.64 |
| 5,671,355 A | 9/1997 | Collins | 395/200.2 |
| 5,678,060 A | 10/1997 | Yokoyama et al. | 709/212 |
| 5,682,534 A | 10/1997 | Kapoor et al. | 395/684 |
| 5,692,130 A | 11/1997 | Shobu et al. | 395/200.12 |
| 5,699,317 A | 12/1997 | Sartore et al. | 395/230.06 |
| 5,699,350 A | 12/1997 | Kraslavsky | 370/254 |
| 5,701,434 A | 12/1997 | Nakagawa | 395/484 |
| 5,701,516 A | 12/1997 | Cheng et al. | 395/842 |
| 5,727,142 A | 3/1998 | Chen | 395/181 |
| 5,742,765 A | 4/1998 | Wong et al. | 395/200 |
| 5,749,095 A | 5/1998 | Hagersten | 711/141 |
| 5,751,715 A | 5/1998 | Chan et al. | 370/455 |
| 5,752,078 A | 5/1998 | Delp et al. | 395/827 |
| 5,758,084 A | 5/1998 | Silverstein et al. | 395/200.58 |
| 5,758,089 A | 5/1998 | Gentry et al. | 395/200.64 |
| 5,758,186 A | 5/1998 | Hamilton et al. | 395/831 |
| 5,758,194 A | 5/1998 | Kuzma | 395/886 |
| 5,768,618 A | 6/1998 | Erickson et al. | 395/829 |
| 5,771,349 A | 6/1998 | Picazo, Jr. et al. | 395/188.01 |
| 5,774,660 A | 6/1998 | Brendel et al. | 395/200.53 |
| 5,778,013 A | 7/1998 | Jedwab | 714/807 |
| 5,778,419 A | 7/1998 | Hansen et al. | 711/112 |
| 5,790,804 A | 8/1998 | Osborne | 709/245 |
| 5,794,061 A | 8/1998 | Hansen et al. | 395/800.01 |
| 5,802,258 A | 9/1998 | Chen | 395/182.08 |
| 5,802,580 A | 9/1998 | McAlpice | 711/149 |
| 5,809,328 A | 9/1998 | Nogales et al. | 395/825 |
| 5,809,527 A | 9/1998 | Cooper et al. | 711/133 |
| 5,812,775 A | 9/1998 | Van Seeters et al. | 395/200.43 |
| 5,815,646 A | 9/1998 | Purcell et al. | 395/163 |
| 5,828,835 A | 10/1998 | Isfeld et al. | 395/200.3 |
| 5,848,293 A | 12/1998 | Gentry | 395/825 |
| 5,872,919 A | 2/1999 | Wakeland et al. | 395/200 |
| 5,878,225 A | 3/1999 | Bilansky et al. | 395/200.57 |
| 5,892,903 A | 4/1999 | Klaus | 395/187.01 |
| 5,898,713 A | 4/1999 | Melzer et al. | 371/53 |
| 5,913,028 A | 6/1999 | Wang et al. | 395/200.33 |
| 5,920,566 A | 7/1999 | Hendel et al. | 370/401 |
| 5,930,830 A | 7/1999 | Mendelson et al. | 711/171 |
| 5,931,918 A | 8/1999 | Row et al. | 709/300 |
| 5,935,205 A | 8/1999 | Murayama et al. | 709/216 |
| 5,937,169 A | 8/1999 | Connery et al. | 395/200.8 |
| 5,941,969 A | 8/1999 | Ram et al. | 710/128 |
| 5,941,972 A | 8/1999 | Hoese et al. | 710/129 |
| 5,950,203 A | 9/1999 | Stakuis et al. | 707/10 |
| 5,987,022 A | 11/1999 | Geiger et al. | 370/349 |
| 5,991,299 A | 11/1999 | Radogna et al. | 370/392 |
| 5,996,013 A | 11/1999 | Delp et al. | 709/226 |
| 5,996,024 A | 11/1999 | Blumenau | 709/301 |
| 6,005,849 A | 12/1999 | Roach et al. | 370/276 |
| 6,009,478 A | 12/1999 | Panner et al. | 710/5 |
| 6,016,513 A | 1/2000 | Lowe | 709/250 |
| 6,021,446 A | 2/2000 | Gentry et al. | 709/303 |
| 6,021,507 A | 2/2000 | Chen | 714/2 |
| 6,026,452 A | 2/2000 | Pitts | 710/56 |
| 6,034,963 A | 3/2000 | Minami et al. | 370/401 |
| 6,038,562 A | 3/2000 | Anjur et al. | 707/10 |
| 6,041,058 A | 3/2000 | Flanders et al. | 370/401 |
| 6,041,381 A | 3/2000 | Hoese | 710/129 |
| 6,044,438 A | 3/2000 | Olnowich | 711/130 |
| 6,047,323 A | 4/2000 | Krause | 709/227 |
| 6,047,356 A | 4/2000 | Anderson et al. | 711/129 |
| 6,049,528 A | 4/2000 | Hendel et al. | 370/235 |
| 6,057,863 A | 5/2000 | Olarig | 345/520 |
| 6,061,368 A | 5/2000 | Hitzelberger | 370/537 |
| 6,065,096 A | 5/2000 | Day et al. | 711/114 |
| 6,067,569 A | 5/2000 | Khaki et al. | 709/224 |
| 6,070,200 A | 5/2000 | Gates et al. | 710/20 |
| 6,078,733 A | 6/2000 | Osborne | 395/200.8 |
| 6,097,734 A | 8/2000 | Gotesman et al. | 370/474 |
| 6,101,555 A | 8/2000 | Goshey et al. | 709/321 |
| 6,111,673 A | 8/2000 | Chang et al. | 359/123 |
| 6,115,615 A | 9/2000 | Ota et al. | 455/553 |
| 6,122,670 A | 9/2000 | Bennett et al. | 709/236 |
| 6,141,701 A | 10/2000 | Whitney | 710/5 |
| 6,141,705 A | 10/2000 | Anand et al. | 710/15 |
| 6,145,017 A | 11/2000 | Ghaffari | 710/5 |
| 6,157,944 A | 12/2000 | Pedersen | |
| 6,157,955 A | 12/2000 | Narad et al. | 709/228 |
| 6,172,980 B1 | 1/2001 | Flanders et al. | 370/401 |
| 6,173,333 B1 | 1/2001 | Jolitz et al. | |
| 6,202,105 B1 | 3/2001 | Gates et al. | 710/20 |
| 6,223,242 B1 | 4/2001 | Sheafor et al. | 710/132 |
| 6,226,680 B1 | 5/2001 | Boucher et al. | 709/230 |
| 6,246,683 B1 | 6/2001 | Connery et al. | 370/392 |
| 6,247,060 B1 | 6/2001 | Boucher et al. | 709/238 |
| 6,279,051 B1 | 8/2001 | Gates et al. | 710/20 |
| 6,289,023 B1 | 9/2001 | Dowling et al. | 370/419 |
| 6,298,403 B1 | 10/2001 | Suri et al. | 710/100 |
| 6,324,649 B1 | 11/2001 | Eyres et al. | 713/202 |
| 6,334,153 B2 | 12/2001 | Boucher et al. | 709/230 |
| 6,343,360 B1 | 1/2002 | Feinleib | 713/1 |
| 6,345,301 B1 | 2/2002 | Burns et al. | 709/230 |
| 6,345,302 B1 | 2/2002 | Bennett et al. | 709/236 |
| 6,356,951 B1 | 3/2002 | Gentry et al. | 709/250 |
| 6,370,599 B1 | 4/2002 | Anand et al. | 710/15 |
| 6,385,647 B1 | 5/2002 | Willis et al. | 709/217 |
| 6,389,468 B1 | 5/2002 | Muller et al. | 709/226 |
| 6,389,479 B1 | 5/2002 | Boucher | 709/243 |
| 6,393,487 B2 | 5/2002 | Boucher et al. | 709/238 |
| 6,421,742 B1 | 7/2002 | Tillier | 710/1 |
| 6,421,753 B1 | 7/2002 | Hoese et al. | 710/129 |
| 6,427,169 B1 | 7/2002 | Elzur | 709/224 |
| 6,427,171 B1 | 7/2002 | Craft et al. | 709/230 |
| 6,427,173 B1 | 7/2002 | Boucher et al. | 709/238 |
| 6,434,620 B1 | 8/2002 | Boucher et al. | 709/230 |
| 6,434,651 B1 | 8/2002 | Gentry, Jr. | 710/260 |
| 6,449,656 B1 | 9/2002 | Elzur et al. | 709/236 |

| | | | |
|---|---|---|---|
| 6,453,360 B1 | 9/2002 | Muller et al. | 709/250 |
| 6,470,415 B1 | 10/2002 | Starr et al. | 711/104 |
| 6,473,425 B1 | 10/2002 | Bellaton et al. | 370/392 |
| 6,480,489 B1 | 11/2002 | Muller et al. | 370/389 |
| 6,487,202 B1 | 11/2002 | Klausmeier et al. | 370/395 |
| 6,487,654 B2 | 11/2002 | Dowling | 712/244 |
| 6,490,631 B1 | 12/2002 | Teich et al. | 709/250 |
| 6,502,144 B1 | 12/2002 | Accarie | 710/8 |
| 6,523,119 B2 | 2/2003 | Pavlin et al. | 713/192 |
| 6,526,446 B1 | 2/2003 | Yang et al. | 709/230 |
| 6,570,884 B1 | 5/2003 | Connery et al. | 370/419 |
| 6,591,302 B2 | 7/2003 | Boucher et al. | 709/230 |
| 6,591,310 B1 | 7/2003 | Johnson | 710/3 |
| 6,648,611 B2 | 11/2003 | Morse et al. | 417/310 |
| 6,650,640 B1 | 11/2003 | Muller et al. | 370/392 |
| 6,657,757 B1 | 12/2003 | Chang et al. | 359/124 |
| 6,658,480 B2 | 12/2003 | Boucher et al. | 709/239 |
| 6,678,283 B1 | 1/2004 | Teplitsky | 370/463 |
| 6,681,364 B1 | 1/2004 | Calvignac et al. | 714/776 |
| 6,687,758 B2 | 2/2004 | Craft et al. | 709/250 |
| 6,697,366 B1 | 2/2004 | Kim | 370/392 |
| 6,697,868 B2 * | 2/2004 | Craft et al. | 709/230 |
| 6,751,665 B2 | 6/2004 | Philbrick et al. | 709/224 |
| 6,757,746 B2 | 6/2004 | Boucher et al. | 709/250 |
| 6,765,901 B1 | 7/2004 | Johnson et al. | 370/352 |
| 6,807,581 B1 | 10/2004 | Starr et al. | 709/250 |
| 6,842,896 B1 | 1/2005 | Redding et al. | 717/172 |
| 6,912,522 B2 | 6/2005 | Edgar | 707/2 |
| 6,938,092 B2 | 8/2005 | Burns | 709/230 |
| 6,941,386 B2 * | 9/2005 | Craft et al. | 709/250 |
| 6,965,941 B2 | 11/2005 | Boucher et al. | 709/230 |
| 6,996,070 B2 | 2/2006 | Starr et al. | 370/252 |
| 7,042,898 B2 | 5/2006 | Blightman et al. | 370/463 |
| 7,076,568 B2 | 7/2006 | Philbrick et al. | 709/250 |
| 7,089,326 B2 | 8/2006 | Boucher et al. | 709/242 |
| 7,093,099 B2 | 8/2006 | Bodas et al. | 711/206 |
| 7,124,205 B2 | 10/2006 | Craft et al. | 709/250 |
| 7,133,940 B2 | 11/2006 | Blightman et al. | 710/22 |
| 7,167,926 B1 | 1/2007 | Boucher et al. | 709/250 |
| 7,167,927 B2 | 1/2007 | Philbrick et al. | 709/250 |
| 7,174,393 B2 | 2/2007 | Boucher et al. | 709/250 |
| 7,185,266 B2 | 2/2007 | Blightman et al. | 714/776 |
| 7,191,241 B2 | 3/2007 | Boucher et al. | 709/230 |
| 7,191,318 B2 | 3/2007 | Tripathy et al. | 712/225 |
| 7,237,036 B2 | 6/2007 | Boucher et al. | 709/245 |
| 7,254,696 B2 | 8/2007 | Mittal et al. | 712/210 |
| 7,284,070 B2 | 10/2007 | Boucher et al. | 709/250 |
| 7,337,241 B2 * | 2/2008 | Boucher et al. | 709/250 |
| 2001/0004354 A1 | 6/2001 | Jolitz | 370/328 |
| 2001/0013059 A1 | 8/2001 | Dawson et al. | 709/217 |
| 2001/0014892 A1 | 8/2001 | Gaither et al. | 707/200 |
| 2001/0014954 A1 | 8/2001 | Purcell et al. | 714/4 |
| 2001/0025315 A1 | 9/2001 | Jolitz | |
| 2001/0048681 A1 | 12/2001 | Bilic et al. | 370/389 |
| 2001/0053148 A1 | 12/2001 | Bilic et al. | 370/389 |
| 2002/0073223 A1 | 6/2002 | Darnell et al. | 709/232 |
| 2002/0112175 A1 | 8/2002 | Makofka et al. | 713/200 |
| 2003/0066011 A1 | 4/2003 | Oren | 714/758 |
| 2003/0110344 A1 | 6/2003 | Szczepanek et al. | 711/100 |
| 2003/0165160 A1 | 9/2003 | Minami et al. | 370/466 |
| 2004/0054814 A1 | 3/2004 | McDaniel | |
| 2004/0059926 A1 | 3/2004 | Angelo et al. | 713/168 |
| 2004/0153578 A1 | 8/2004 | Elzur | |
| 2004/0213290 A1 | 10/2004 | Johnson et al. | 370/469 |
| 2004/0246974 A1 | 12/2004 | Gyugyi et al. | 370/395.31 |

FOREIGN PATENT DOCUMENTS

| | | |
|---|---|---|
| WO | WO 99/04343 | 1/1999 |
| WO | WO 99/65219 | 12/1999 |
| WO | WO 00/13091 | 3/2000 |
| WO | WO 01/04770 | 1/2001 |
| WO | WO 01/05107 | 1/2001 |
| WO | WO 01/05116 | 1/2001 |
| WO | WO 01/05123 | 1/2001 |
| WO | WO 01/40960 | 6/2001 |
| WO | WO 01/59966 | 8/2001 |
| WO | WO 01/86430 | 11/2001 |

OTHER PUBLICATIONS

Zilog product Brief entitled "Z85C30 CMOS SCC Serial Communication Controller", Zilog Inc., 3 pages, 1997.

Internet pages of Xpoint Technologies, Inc. entitled "Smart LAN Work Requests", 5 pages, printed Dec. 19, 1997.

Internet pages entitled: Asante and 100BASE-T Fast Ethernet. 7 pages, printed May 27, 1997.

Internet pages entitled: A Guide to the Paragon XP/S-A7 Supercomputer at Indiana University. 13 pages, printed Dec. 21, 1998.

Richard Stevens, "TCP/IP Illustrated, vol. 1, The Protocols", pp. 325-326 (1994).

Internet pages entitled: Northridge/Southbridge vs. Intel Hub Architecture, 4 pages, printed Feb. 19, 2001.

Gigabit Ethernet Technical Brief, Achieving End-to-End Performance. Alteon Networks, Inc., First Edition, Sep. 1996, 15 pages.

Internet pages directed to Technical Brief on Alteon Ethernet Gigabit NIC technology, www.alteon.com, 14 pages, printed Mar. 15, 1997.

VIA Technologies, Inc. article entitled "VT8501 Apollo MVP4", pp. i-iv, 1-11, cover and copyright page, revision 1.3, Feb. 1, 2000.

iReady News Archives article entitled "iReady Rounding Out Management Team with Two Key Executives", http://www.ireadyco.com/archives/keyexec.html, 2 pages, printed Nov. 28, 1998.

"Toshiba Delivers First Chips to Make Consumer Devices Internet-Ready Based On iReady's Design," Press Release Oct. 1998, 3 pages, printed Nov. 28, 1998.

Internet pages from iReady Products, web sitehttp://www.ireadyco.com/products,html, 2 pages, downloaded Nov. 25, 1998.

iReady News Archives, Toshiba, iReady shipping Internet chip, 1 page, printed Nov. 25, 1998.

Interprophet article entitled "Technology", http://www.interprophet.com/technology.html, 17 pages, printed Mar. 1, 2000.

iReady Corporation, article entitled "The I-1000 Internet Tuner", 2 pages, date unknown.

iReady article entitled "About Us Introduction", Internet pages fromhttp://www.iReadyco.com/about.html, 3 pages, printed Nov. 25, 1998.

iReady News Archive article entitled "Revolutionary Approach to Consumer Electronics Internet Connectivity Funded", San Jose, CA, Nov. 20, 1997. 2 pages, printed Nov. 2, 1998.

iReady News Archive article entitled "Seiko Instruments Inc. (SII) Introduces World's First Internet-Ready Intelligent LCD Modules Based on iReady Technology," Santa Clara, CA and Chiba, Japan, Oct. 26, 1998. 2 pages, printed Nov. 2, 1998.

NEWSwatch article entitled "iReady internet Tuner to Web Enable Devices", Tuesday, Nov. 5, 1996, printed Nov. 2, 1998, 2 pages.

EETimes article entitled "Tuner for Toshiba, Toshiba Taps iReady for Internet Tuner", by David Lammers, 2 pages, printed Nov. 2, 1998.

"Comparison of Novell Netware and TCP/IP Protocol Architectures", by J.S. Carbone, 19 pages, printed Apr. 10, 1998.

Adaptec article entitled "AEA-7110C-a DuraSAN product", 11 pages, printed Oct. 1, 2001.

iSCSI HBA article entitled "iSCSI and 2Gigabit fibre Channel Host Bus Adapters from Emulex, QLogic, Adaptec, JNI", 8 pages, printed Oct. 1, 2001.

iSCSI HBA article entitled "FCE-3210/6410 32 and 64-bit PCI-to-Fibre Channel HBA", 6 pages, printed Oct. 1, 2001.

ISCSI.com article entitled "iSCSI Storage", 2 pages, printed Oct. 1, 2001.

"Two-Way TCP Traffic Over Rate Controlled Channels: Effects and Analysis", by Kalampoukas et al., IEEE Transactions on Networking, vol. 6, No. 6, Dec. 1998, 17 pages.

IReady News article entitled "Toshiba Delivers First Chips to Make Consumer Devices Internet-Ready Based on iReady Design", Santa Clara, CA, and Tokyo, Japan, Oct. 14, 1998, printed Nov. 2, 1998, 3 pages.

Internet pages of InterProphet entitled "Frequently Asked Questions", by Lynne Jolitz, printed Jun. 14, 2000, 4 pages.

"File System Design For An NFS File Server Appliance", Article by D. Hitz, et al., 13 pages.

Adaptec Press Release article entitled "Adaptec Announces EtherStorage Technology", 2 pages, May 4, 2000, printed Jun. 14, 2000.

Adaptec article entitled "EtherStorage Frequently Asked Questions", 5 pages, printed Jul. 19, 2000.

Adaptec article entitled "EtherStorage White Paper", 7 pages, printed Jul. 19, 2000.

CIBC World Markets article entitled "Computers; Storage", by J. Berlino et al., 9 pages, dated Aug. 7, 2000.

Merrill Lynch article entitled "Storage Futures", by S. Milunovich, 22 pages, dated May 10, 2000.

CBS Market Watch article entitled "Montreal Start-Up Battles Data Storage Botttleneck", by S. Taylor, dated Mar. 5, 2000, 2 pages, printed Mar. 7, 2000.

Internet-draft article entitled "SCSI/TCP (SCSI over TCP)", by J. Satran et al., 38 pages, dated Feb. 2000, printed May 19, 2000.

Internet pages entitled Technical White Paper-Xpoint's Disk to LAN Acceleration Solution for Windows NT Server, printed Jun. 5, 1997, 15 pages.

Jato Technologies article entitled Network Accelerator Chip Architecture, twelve-slide presentation, printed Aug. 19, 1998, 13 pages.

EETimes article entitled Enterprise System Uses Flexible Spec, dated Aug. 10, 1998, printed Nov. 25, 1998, 3 pages.

Internet pages entitled "Smart Ethernet Network Interface Cards", which Berend Ozceri is developing, printed Nov. 25, 1998, 2 pages.

Internet pages of Xaqti corporation entitled "GigaPower Protocol Processor Product Review," printed Nov. 25, 1999, 4 pages.

Internet pages entitled "DART: Fast Application Level Networking via Data-Copy Avoidance," by Robert J. Walsh, printed Jun. 3, 1999, 25 pages.

Schwaderer et al., IEEE Computer Society Press publication entitled, "XTP in VLSI Protocol Decomposition for ASIC Implementation", from 15th Conference on Local Computer Networks, 5 pages, Sep. 30-Oct. 3, 1990.

Beach, Bob, IEEE Computer Society Press publication entitled, "UltraNet: An Architecture for Gigabit Networking", from 15th Conference on Local Computer Networks, 18 pages, Sep. 30-Oct. 3, 1990.

Chesson et al., IEEE Syposium Record entitled, "The Protocol Engine Chipset", from Hot Chips III, 16 pages, Aug. 26-27, 1991.

Maclean et al., IEEE Global Telecommunications Conference, Globecom '91, presentation entitled, "An Outboard Processor for High Performance Implementation of Transport Layer Protocols", 7 pages, Dec. 2-5, 1991.

Ross et al., IEEE article entitled "FX1000: A high performance single chip Gigabit Ethernet NIC", from Compcon '97 Proceedings, 7 pages, Feb. 23-26, 1997.

Strayer et al., "Ch. 9: The Protocol Engine" from XTP: The Transfer Protocol, 12 pages, Jul. 1992.

Publication entitled "Protocol Engine Handbook", 44 pages, Oct. 1990.

Koufopavlou et al., IEEE Global Telecommunications Conference, Globecom '92, presentation entitled, "Parallel TCP for High Performance Communication Subsystems", 7 pages, Dec. 6-9, 1992.

Lilienkamp et al., Publication entitled "Proposed Host-Front End Protocol", 56 pages, Dec. 1984.

Article from Rice University entitled "LRP: A New Network Subsystem Architecture for Server Systems", by Peter Druschel and Gaurav Banga, 14 pages.

Internet RFC/STD/FYI/BCP Archives article with heading "RFC2140" entitled "TCP Control Block Interdependence", web address http://www.faqs.org/rfcs/rfc2140.html, 9 pages, printed Sep. 20, 2002.

WindRiver article entitled "Tornado: For Intelligent Network Acceleration", copyright Wind River Systems, 2001, 2 pages.

WindRiver White Paper entitled "Complete TCP/IP Offload for High-Speed Ethernet Networks", Copyright Wind River Systems, 2002, 7 pages.

Intel article entitled "Solving Server Bottlenecks with Intel Server Adapters", Copyright Intel Corporation, 1999, 8 pages.

Thia et al. Publication entitled "High-Speed OSI Protocol Bypass Algorithm with Window Flow Control," Protocols for High Speed Networks, pp. 53-68, 1993.

Thia et al. Publication entitled "A Reduced Operational Protocol Engine (ROPE) for a multiple-layer bypass architecture," Protocols for High Speed Networks, pp. 224-239, 1995.

Form 10-K for Exelan, Inc., for the fiscal year ending Dec. 31, 1987 (10 pages).

Form 10-K for Exelan, Inc., for the fiscal year ending Dec. 31, 1988 (10 pages).

* cited by examiner

ZERO COPY METHOD FOR RECEIVING DATA BY A NETWORK INTERFACE

CROSS REFERENCE TO RELATED APPLICATIONS

The present application claims the benefit under 35 U.S.C. §120 of (and is a continuation of) U.S. patent application Ser. No. 10/706,398, filed Nov. 12, 2003 now U.S. Pat. No. 6,941,386, which in turn claims the benefit under 35 U.S.C. §120 of (and is a continuation of) U.S. patent application Ser. No. 10/208,093, filed Jul. 29, 2002, now U.S. Pat. No. 6,697,868, which in turn claims the benefit under 35 U.S.C. §120 of (and is a continuation-in-part of) U.S. patent application Ser. No. 09/514,425, filed Feb. 28, 2000, now U.S. Pat. No. 6,427,171, which in turn claims the benefit under 35 U.S.C. §120 of (and is a continuation-in-part of): a) U.S. patent application Ser. No. 09/141,713, filed Aug. 28, 1998, now U.S. Pat. No. 6,389,479, which in turn claims the benefit under 35 U.S.C. §119 of provisional application 60/098,296, filed Aug. 27, 1998; b) U.S. patent application Ser. No. 09/067,544, filed Apr. 27, 1998, now U.S. Pat. No. 6,226,680, which in turn claims the benefit under 35 U.S.C. §119 of provisional application 60/061,809, filed Oct. 14, 1997; and c) U.S. patent application Ser. No. 09/384,792, filed Aug. 27, 1999, now U.S. Pat. No. 6,434,620, which in turn claims the benefit under 35 U.S.C. §119 of provisional application 60/098,296, filed Aug. 27, 1998.

Application Ser. No. 10/208,868, now U.S. Pat. No. 6,697,868 also claims the benefit under 35 U.S.C. §120 of (and is a continuation-in-part of) U.S. patent application Ser. No. 09/464,283, filed Dec. 15, 1999, now U.S. Pat. No. 6,427,173, which in turn claims the benefit under 35 U.S.C. §120 of (and is a continuation-in-part of) U.S. patent application Ser. No. 09/439,603, filed Nov. 12, 1999, now U.S. Pat. No. 6,247,060, which in turn claims the benefit under 35 U.S.C. §120 of (and is a continuation-in-part of) U.S. patent application Ser. No. 09/067,544, filed Apr. 27, 1998, now U.S. Pat. No. 6,226,680, which in turn claims the benefit under 35 U.S.C. §119 of provisional application 60/061,809, filed Oct. 14, 1997.

The subject matter of all of the applications listed above and patents listed above is incorporated herein by reference.

REFERENCE TO COMPACT DISC APPENDIX

The Compact Disc Appendix (CD Appendix), which is a part of the present disclosure, includes three folders, designated CD Appendix A, CD Appendix B, and CD Appendix C on the compact disc. CD Appendix A contains a hardware description language (verilog code) description of an embodiment of a receive sequencer. CD Appendix B contains microcode executed by a processor that operates in conjunction with the receive sequencer of CD Appendix A. CD Appendix C contains a device driver executable on the host as well as ATCP code executable on the host. A portion of the disclosure of this patent document contains material (other than any portion of the "free BSD" stack included in CD Appendix C) which is subject to copyright protection. The copyright owner of that material has no objection to the facsimile reproduction by anyone of the patent document or the patent disclosure, as it appears in the Patent and Trademark Office patent files or records, but otherwise reserves all copyright rights.

TECHNICAL FIELD

The present invention relates to the management of information communicated via a network, including protocol processing.

BACKGROUND

Various individuals, companies and governments have worked for many years to provide communication over computer networks. As different computer and network architectures have been created, many types of protocols have evolved to facilitate that communication. Conventionally, network messages contain information regarding a number of protocol layers that allow information within the messages to be directed to the correct destination and decoded according to appropriate instructions, despite substantial differences that may exist between the computers or other devices transmitting and receiving the messages. Processing of these messages is usually performed by a central processing unit (CPU) running software instructions designed to recognize and manipulate protocol information contained in the messages.

With the increasing prevalence of network communication, a large portion of the CPU's time may be devoted to such protocol processing, interfering with other tasks the CPU may need to perform. Multiple interrupts to the CPU can also be problematic when transferring many small messages or for large data transfers, which are conventionally divided into a number of packets for transmission over a network.

SUMMARY

In accordance with the present invention, means for offloading some of the most time consuming protocol processing from a host CPU to a specialized device designed for network communication processing are provided. The host has a protocol processing stack that provides instructions not only to process network messages but also to allocate processing of certain network messages to the specialized network communication device. By allocating some of the most common and time consuming network processes to the network communication device, while retaining the ability to handle less time intensive and more varied processing on the host stack, the network communication device can be relatively simple and cost effective. The host CPU, operating according to the instructions from the stack, and the specialized network communication device together determine whether and to what extent a given message is processed by the host CPU or by the network communication device.

DESCRIPTION OF THE PREFERRED EMBODIMENT

Figure 1:
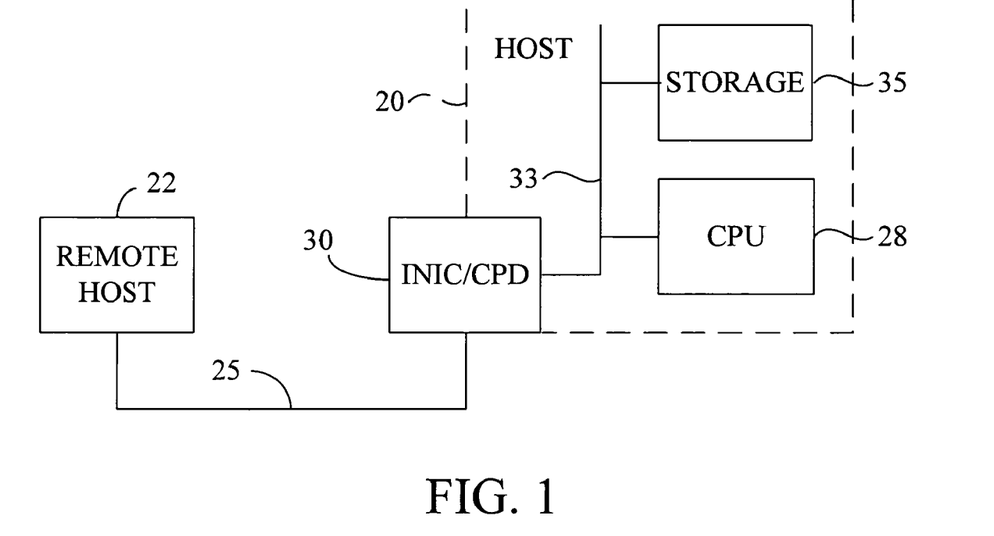
FIG. 1 is a schematic plan view of a host computer having an intelligent network interface card or communication processing device (INIC/CPD) connected to a remote host via a network.

Referring now to FIG. 1, the present invention can operate in an environment including a host computer shown generally at 20 connected to a remote host 22 via a network 25. The host 20 includes a central processing unit (CPU) 28 and storage 35, while an intelligent network interface card or communication processing device (INIC/CPD) 30 provides an interface between the host and the network 25. A computer is defined in the present invention to be a device including a CPU, a memory and instructions for running the CPU. The network 25 is a medium for transmission of information from one computer to another, such as conductive wires, optical fibers or wireless space, including any supporting hardware or software such as switches and routers. Network implementations include local area networks, wide area networks, telecommunication networks and the Internet. The INIC/CPD 30 is depicted on a border of host 20 because the INIC/CPD provides a network interface that may be added with an adapter card, for example, or integrated as a part of the host computer. A bus 33 such as a peripheral component interface (PCI) bus provides a connection within the host 20 between the CPU 28, the INIC/CPD 30, and a storage device 35 such as a semiconductor memory or disk drive, along with any related controls.

Figure 2:
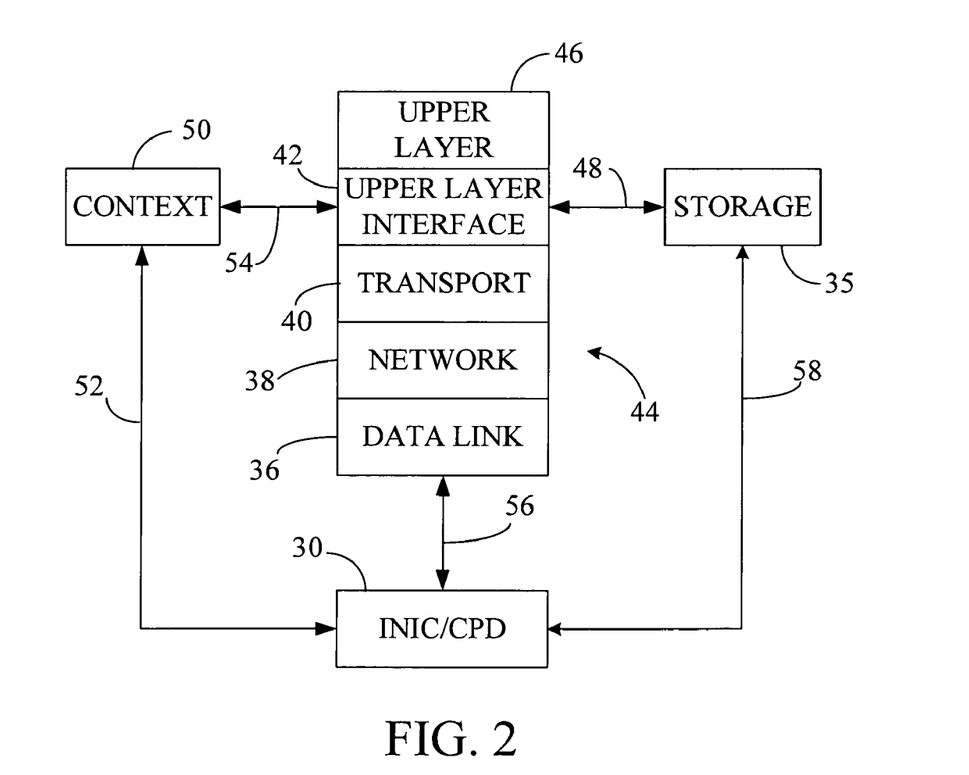
FIG. 2 is a schematic plan view of a protocol processing stack of the present invention passing a connection context between host storage and the INIC/CPD.

Referring additionally to FIG. 2, the host CPU 28 runs a protocol processing stack 44 of instructions stored in storage 35, the stack including a data link layer 36, network layer 38, transport layer 40, upper layer 46 and an upper layer interface 42. A general description of these protocol layers can be found in the book by W. Richard Stevens entitled TCP/IP Illustrated, Volume 1 (13$^{th}$ printing, 1999), which is incorporated herein by reference. The upper layer 46 may represent a session, presentation and/or application layer, depending upon the particular protocol being employed and message communicated. The upper layer interface 42, along with the CPU 28 and any related controls can send or retrieve data to or from the upper layer 46 or storage 35, as shown by arrow 48. The upper layer interface 42 may be called a Transport driver interface (TDI), for example, in accord with Microsoft terminology. A connection context 50 has been created, as will be explained below, the context summarizing various features of a message connection, such as the protocol types, source and destination addresses and status of the message. The context 50 may be passed between an interface for the session layer 42 and the INIC/CPD 30, as shown by arrows 52 and 54, and stored as a communication control block (CCB) of information in either an INIC/CPD 30 memory or storage 35.

When the INIC/CPD 30 holds a CCB defining a particular connection, data received by the INIC/CPD from the network and pertaining to the connection is referenced to that CCB and can then be sent directly to storage 35 according to a fast-path 58, bypassing sequential protocol processing by the data link 36, network 38 and transport 40 layers. Transmitting a message, such as sending a file from storage 35 to remote host 22, can also occur via the fast-path 58, in which case the context for the file data is added by the INIC/CPD 30 referencing the CCB, rather than by sequentially adding headers during processing by the transport 40, network 38 and data link 36 layers. The DMA controllers of the INIC/CPD 30 can perform these message transfers between INIC/CPD and storage 35.

The INIC/CPD 30 can collapse multiple protocol stacks each having possible separate states into a single state machine for fast-path processing. The INIC/CPD 30 does not handle certain exception conditions in the single state machine, primarily because such conditions occur relatively infrequently and to deal with them on the INIC/CPD would provide little performance benefit to the host. A response to such exceptions can be INIC/CPD 30 or CPU 28 initiated. The INIC/CPD 30 deals with exception conditions that occur on a fast-path CCB by passing back or flushing to the host protocol stack 44 the CCB and any associated message frames involved, via a control negotiation. The exception condition is then processed in a conventional manner by the host protocol stack 44. At some later time, usually directly after the handling of the exception condition has completed and fast-path processing can resume, the host stack 44 hands the CCB back to the INIC/CPD. This fallback capability enables most performance-impacting functions of the host protocols to be quickly processed by the specialized INIC/CPD hardware, while the exceptions are dealt with by the host stacks, the exceptions being so rare as to negligibly effect overall performance.

Figure 3:
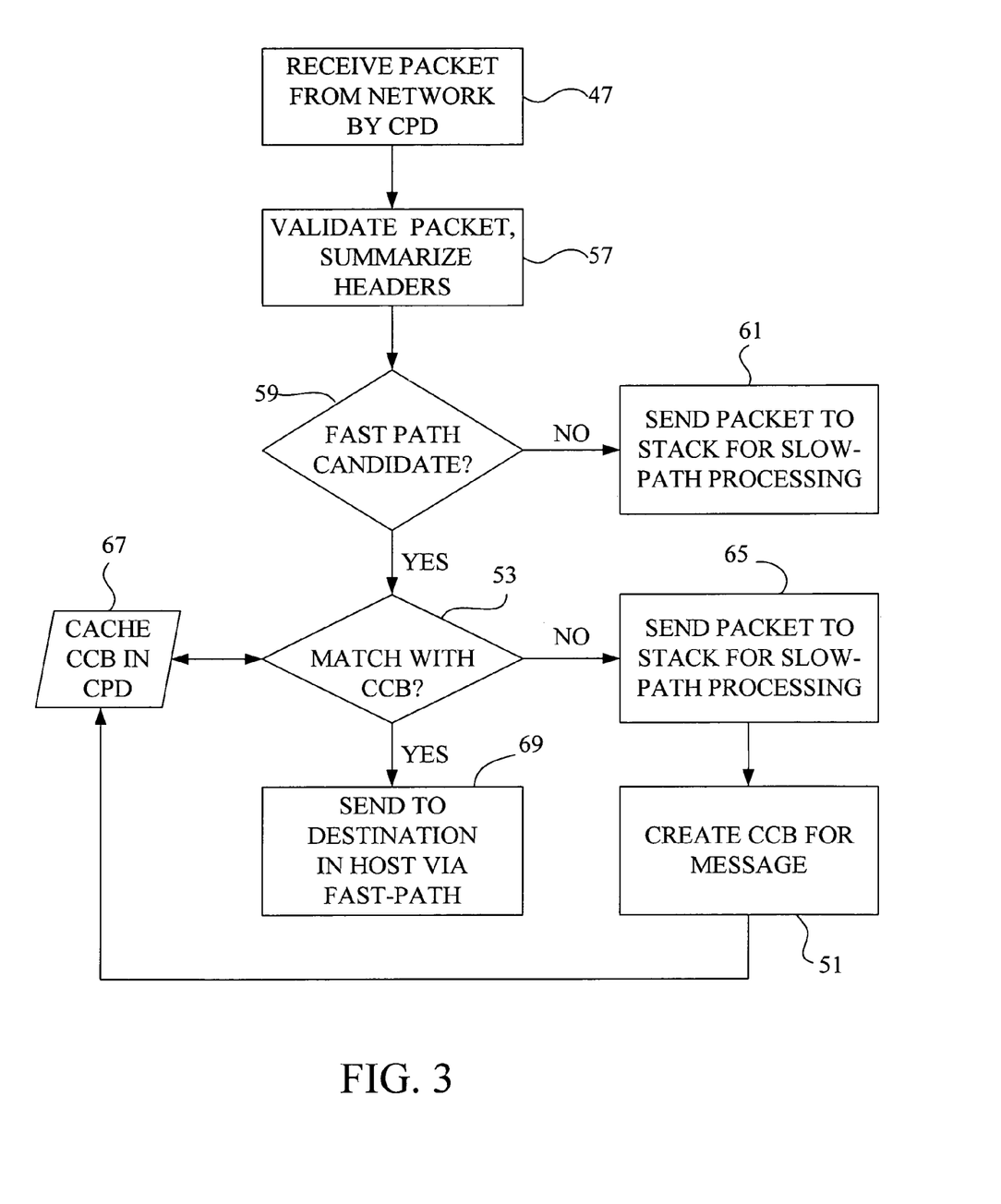
FIG. 3 is a diagram of a general method employed to process messages received by the host computer via the INIC/CPD.

FIG. 3 diagrams a general flow chart for messages sent to the host via the network according to the current invention. A large TCP/IP message such as a file transfer may be received by the host from the network in a number of separate, approximately 64 KB transfers, each of which may be split into many, approximately 1.5 KB frames or packets for transmission over a network. Novel NetWare® protocol suites running Sequenced Packet Exchange Protocol (SPX) or NetWare® Core Protocol (NCP) over Internetwork Packet Exchange (IPX) work in a similar fashion. Another form of data communication which can be handled by the fast-path is Transaction TCP (hereinafter T/TCP or TTCP), a version of TCP which initiates a connection with an initial transaction request after which a reply containing data may be sent according to the connection, rather than initiating a connection via a several-message initialization dialogue and then transferring data with later messages. In general, any protocol for which a connection can be set up to define parameters for a message or plurality of messages between network hosts may benefit from the present invention. In any of the transfers typified by these protocols, each packet conventionally includes a portion of the data being transferred, as well as headers for each of the protocol layers and markers for positioning the packet relative to the rest of the packets of this message.

When a message packet or frame is received 47 from a network by the INIC/CPD, it is first validated by a hardware assist. This includes determining the protocol types of the various layers of the packet, verifying relevant checksums, and summarizing 57 these findings into a status word or words. Included in these words is an indication whether or not the frame is a candidate for fast-path data flow. Selection 59 of fast-path candidates is based on whether the host may benefit from this message connection being handled by the INIC/CPD, which includes determining whether the packet has header bytes denoting particular protocols, such as TCP/IP or SPX/IPX for example. The typically small percentage of frames that are not fast-path candidates are sent 61 to the host protocol stacks for slow-path protocol processing. Subsequent network microprocessor work with each fast-path candidate determines whether a fast-path connection such as a TCP or SPX CCB is already extant for that candidate, or whether that candidate may be used to set up a new fast-path connection, such as for a TTCP/IP transaction. The validation provided by the INIC/CPD provides advantages whether a frame is processed by the fast-path or a slow-path, as only error free, validated frames are processed by the host CPU even for the slow-path processing.

All received message frames which have been determined by the INIC/CPD hardware assist to be fast-path candidates are examined 53 by the network microprocessor or INIC comparator circuits to determine whether they match a CCB held by the INIC/CPD. Upon confirming such a match, and assuming no exception conditions exist, the INIC/CPD removes lower layer headers and sends 69 the remaining application data from the frame directly into its final destination in the host using direct memory access (DMA) units of the INIC/CPD. This operation may occur immediately upon receipt of a message packet, for example when a TCP connection already exists and destination buffers have been negotiated, or it may first be necessary to process an initial header to acquire a new set of final destination addresses for this transfer. In this latter case, the INIC/CPD will queue subsequent message packets while waiting for the destination address, and then DMA the queued application data to that destination. The final destination addresses may be provided as a scatter-gather list of host buffer address and length pairs. For a Microsoft type operating system and stack 44, the scatter gather list is a memory descriptor data list (MDL).

A fast-path candidate that does not match a CCB may be used to set up a new fast-path connection, by sending 65 the frame to the host for sequential protocol processing. In this case, the host uses this frame to create 51 a CCB, which is then passed to the INIC/CPD to control subsequent frames on that connection. The CCB, which is cached 67 in the INIC/CPD, includes control and state information pertinent to all protocols that would have been processed had conventional software layer processing been employed. The CCB also contains storage space for per-transfer information used to facilitate moving application-level data contained within subsequent related message packets directly to a host application in a form available for immediate usage. The INIC/CPD takes command of connection processing upon receiving a CCB for that connection from the host.

As mentioned above, the present invention improves system performance by offloading TCP/IP data processing from the host protocol stack to the INIC/CPD. Since only the data movement portion of the protocol stack is offloaded, TCP control processing generally remains on the host protocol stack. In addition, the host protocol stack also handles TCP exception processing, such as retransmissions. Leaving TCP control and exception processing on the host protocol stack has the advantage of giving the operating system complete control over the TCP connection. This is convenient because the operating system may choose not to hand out a connection to the network communication device for various reasons. For example, if someone wishes to monitor network frames on the host, the host protocol stack can be programmed to handle all TCP connections, so that no packets are processed on the INIC/CPD. A second advantage to leaving TCP control and exception processing on the host protocol stack is that this greatly simplifies the complexity of operations required by the INIC/CPD, which can be made from an inexpensive application specific integrated circuit (ASIC) as opposed to an expensive CPU.

In order for a connection to be handled by both the host protocol stack 44 for control and exception conditions, and by the INIC/CPD 30 for data movement, the connection context is made to migrate between the host and the INIC/CPD. A CCB, which contains the set of variables used to represent the state of a given TCP connection, provides the mechanism for this migration. Transfer of a CCB from the host to the INIC/CPD is termed a connection handout, and transfer of a CCB from the INIC/CPD back to the host is termed a connection flush. This transfer may occur several times during the course of a TCP connection as the result of dropped packets or other exceptions, which are discussed below. Once a connection handout occurs, the INIC/CPD handles all TCP processing, according to the fast-path mode. Any message transmissions occurring while in the fast-path mode are referred to as fast-path sends. Likewise, any message receptions that occur while in the fast-path mode are referred to as fast-path receives.

A portion of the CCB corresponds to a conventional TCP control block, containing items such as sequence numbers and ports, as well as lower protocol values such as IP addresses and the first-hop MAC addresses. A list of variables for such a conventional TCP control block can be found in the book by Gary R. Wright and W. Richard Stevens entitled TCP/IP Illustrated, Volume 2 ($7^{th}$ Edition, 1999), which is incorporated by reference herein, on pages 803-805.

In addition to those TCP variables, a number of variables are provided in the CCB for maintaining state information involving the present invention. A first of these variables, a character termed conn_nbr, denotes the connection number for this CCB. The INIC/CPD 30 may maintain, for example, 256 connections, so that the conn_nbr delineates which of those connections is defined by this CCB. Another CCB-specific variable is termed hosttcbaddr, which lists the address in the host for this particular CCB. This address is used when the CCB is returned from the INIC/CPD to the host. For accelerated processing of the most active connections, the INIC/CPD 30 stores the connections in a hash table in SRAM. A CCB variable termed HashValue gives a hash table offset for the CCB, which is a hash of the source and destination IP addresses, and source and destination TCP ports for the connection.

Another character, termed buff_state, tells whether a CCB that has been cached in SRAM matches the corresponding CCB stored in DRAM. After processing of a frame or burst of frames against an SRAM cached connection, the state of the CCB is changed, which is indicated by the buff_state character. When the cached connection is flushed back by DMA to DRAM, replacing the CCB held in DRAM with the SRAM CCB having updated status, the character buff_state is set clean.

Additional variables contained in a CCB include a character termed rcv_state, which denotes the status of a receive finite state machine for the CCB, and a character termed xmt_state, which denotes the status of a transmit finite state machine for the CCB. Both of these state machines pertain to fast path processing by the INIC/CPD 30. In other words, the state of a fast path receive state machine for a given CCB can be defined by a number of different values indicated by the setting of the rcv_state character, and the state of a fast path transmit state machine for that CCB can be likewise be defined by the setting of the xmt_state character. Events processed against the receive and transmit state machines are denoted in the CCB by characters labeled rcv_evts and xmt_evts, respectively. These event characters offer a history of events that have transpired as well as the current events affecting those state machines. For example, the rcv_evts character may contain eight bits defining previous events and another eight bits defining current events, with the xmt-evts character similarly apportioned.

Also contained in a CCB are variables associated with frames that have been received by the INIC/CPD 30 corresponding to the connection. For example, fast path received frames may accumulate in the host while the INIC/CPD 30 is waiting for an MDL delineating a host destination for the received message. A CCB field termed RcvQ[RCV_MAX] offers a number of thirty-two-bit words for storing pointers to such frames in DRAM, essentially forming a receive queue. A CCB variable termed OfIIO (for overflow input/output pointers), offers information corresponding to the RcvQ, such as pointers to the last frame in and first frame out, while a variable termed QdCnt indicates the number of frames in the RcvQ.

A number of CCB variables pertain to the MDL that has been provided for storing a received message. A character termed RHHandle is used to report to the host a command that has been completed by the INIC/CPD 30 regarding that MDL. RNxtDAdd is a CCB field that is used to denote the next scatter/gather address list to be acquired from DRAM in the INIC/CPD 30 for storage according to the MDL. The variable RCurBuff describes the current buffer of the MDL for storing data, and RCurLen tells the length of that buffer. Similarly, the variable RNxtBuff tells the next receive buffer from the MDL for storing data, and RNxtLen tells the length of that buffer. RTotLen is used to designate the total length of the MDL, which is reduced as data is stored in the buffers designated by the MDL.

The CCB similarly keeps track of buffer queues during transmission of a message. The variable XNxtDAdd pertains to the next address in INIC/CPD 30 DRAM from which to acquire a scatter/gather list of data to be sent over a network; while XTotLen provides the total length of the data to be sent, which is reduced as data is sent. The variable XCurBuff describes the current host buffer from which to send data, and XCurLen tells the length of that buffer. Similarly, the variable XNxtBuff tells the next host buffer from which data is acquired, and XNxtLen tells the length of that buffer.

Some CCB variables pertain to commands sent from the host stack 44 to the INIC/CPD 30 during transmission of a message. Several commands sent by the host regarding a particular CCB may be processed at one time by the INIC/CPD 30, and the CCB maintains variables keeping track of those commands. A variable termed XRspSN holds a TCP sequence number for each message that has been sent over a network. This TCP sequence number is used for matching with an acknowledgement (ACK) from the remote host of receipt of that transmission. A variable termed XHHandle provides a handle or DRAM address of the host regarding a particular command, so that for example upon receiving such an ACK the INIC/CPD can notify the host. CCB variables that keep track of commands being processed by the INIC/CPD include XCmdIn, which tells the next command storage slot, XCmdOut, which describes the command to be executed, and XCmd2Ack, which points to commands that have been sent but not yet ACKed. XCmdCnts lists the number of commands currently being processed and commands that have been sent but not yet ACKed. XmtQ provides a queued list of all the commands being processed by the INIC/CPD.

The CCB also contains a couple of fields for IP and TCP checksums, termed ip_ckbase and tcp_ckbase, respectively. Fast-path transmission of a message occurs with the INIC/CPD prepending protocol headers derived from the CCB to message data provided by the host for the CCB. The ip_ckbase and tcp_ckbase offer the possibility of adjusting the base checksums provided by the host for prepending to the data along with the headers.

As mentioned above, fast-path operations can be divided into four categories: handout, flush, send and receive. These fast-path operations may be implemented in the form of a generic Microsoft Task Offload (TCP_TASK_OFFLOAD), which may be independent from the specific hardware of the INIC/CPD 30. For the currently preferred implementation, hardware-specific code is placed in the NDIS miniport driver. Implementations for other protocol processing stacks, such as for Unix, Linux, Novel or Macintosh operating systems, may also be hardware-independent. The present invention illustrates a Microsoft stack implementation since it involves one of the most popular operating systems, and substantial improvements are provided. The description below illustrates the modifications required to integrate the four basic fast-path operations into the Microsoft TCP/IP protocol processing stack. Also defined is the format of the TCP_TASK_OFFLOAD as well as miscellaneous issues associated with these changes.

Support for the fast-path offload mechanisms requires the definition of a new type of TCP_TASK_OFFLOAD. As with other task offloads, TCP will determine the capabilities of the NDIS miniport by submitting an OID_TCP_TASK_OFFLOAD OID to the driver.

Fast-path information is passed between the protocol processing stack 44 and the miniport driver 70 as media specific information in an out-of-band data block of a packet descriptor. There are two general fast-path TCP_TASK_OFFLOAD structures—commands and frames. The TCP_OFFLOAD_COMMAND structure contains fast-path information that is being sent from the TCPIP driver to the miniport. The TCP_OFFLOAD_FRAME structure contains fast-path information being sent from the miniport to the TCPIP driver. The header file that defines the fast-path TCP_TASK_OFFLOAD mechanism is described on a later page.

Six types of offload commands are defined below:

1] TCP_OFFLOAD_HANDOUT1 (this is the first phase of a two-phase handshake used in the connection handout);

2] TCP_OFFLOAD_HANDOUT2 (this is the second phase of the two-phase handshake used in the connection handout);

3] TCP_OFFLOAD_FLUSH (this command is used to flush a connection);

4] TCP_OFFLOAD_SENDMDL (this command is used to send fast-path data);

5] TCP_OFFLOAD_RCVMDL (this is the command used to pass an MDL scatter gather list to the INIC/CPD for receive data);

6] TCP_OFFLOAD_WINUPDATE (this command is used to send a TCP window update to the INIC/CPD); and 7] TCP_OFFLOAD_CLOSE (This command is used to close a TCP connection that is on the INIC/CPD).

Three types of offload frames are defined below:

1) TCP_OFFLOAD_FRAME_INTERLOCK (this is part of the two-phase handshake used in the connection handout);

2) TCP_OFFLOAD_FLUSH (this is used by the miniport to flush a connection to the host);

3) TCP_OFFLOAD_FRAME_DATA (this is used to indicate newly arrived fast-path data).

Figure 4:
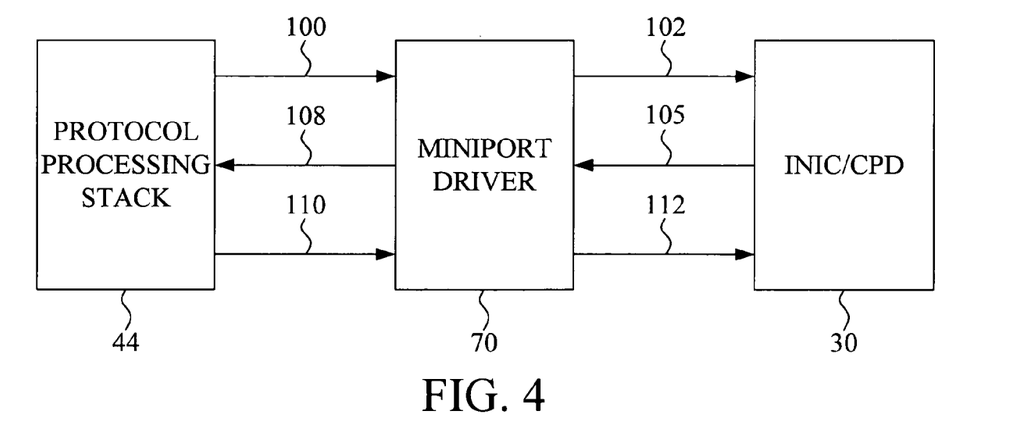
FIG. 4 illustrates a handout of the connection context from the host protocol processing stack to the INIC/CPD via a miniport driver installed in the host.

FIG. 4 illustrates the migration of a connection context during a handout from the host protocol processing stack 44 to the INIC/CPD 30 via a miniport driver 70 installed in the host 20. Two of the TCP offload commands and one of the TCP offload frames that were defined above are illustrated here. The miniport driver 70 converts these commands into hardware specific interactions with the INIC/CPD 30.

The connection handout is implemented as a two-phase operation to prevent race conditions. If instead a handout were attempted in a single-phase operation, there could be a period of time during which the protocol processing stack 44 had issued the handout but the INIC/CPD 30 had not yet received the handout. During this time, slow-path input data frames could arrive and be processed by the protocol processing stack 44. Should this happen, the context information, which the protocol processing stack 44 passed to the INIC/CPD 30, would no longer be valid. This potential error is avoided by establishing a provisional context on the INIC/CPD 30 with the first handout command.

Thus a handout of a CCB from the stack 44 to the INIC/CPD 30 for a connection to be processed by the fast-path occurs in several steps. First, a TCP_OFFLOAD_HANDOUT1 100 is sent from the stack 44 to the miniport driver 70, which issues a Handout1 command 102 to the INIC/CPD 30. The INIC/CPD 30 sends an interlock frame 105 to the miniport driver 70 upon receipt of the handout1 command 102, and internally queues any subsequent frames for the specified connection. Upon receipt of the interlock frame 105, the miniport driver 70 sends a TCP_OFFLOAD_FRAME_INTERLOCK frame 108 to the stack 44, which interprets frame 108 as a signal that no further slow-path frames are expected. Stack 44 thereupon completes the handshake by issuing a TCP_OFFLOAD_HANDOUT2 command 110 that includes a CCB, which is forwarded by the miniport driver 70 to the INIC/CPD 30 as a handout2 112. Upon receipt of the handout2 112, the INIC/CPD 30 reads the contents of the CCB and begins fast-path processing. Note that the CCB address is passed to the miniport in the TCP_OFFLOAD HANDOUT2 command.

Once a connection has been placed in fast-path mode by the CCB handout, subsequent fast-path commands will require a way to identify the particular connection. The present invention defines two opaque handles for this purpose. A HostContext handle is a value used to uniquely identify a connection to the protocol processing stack 44. For TCP/IP messages the value is the address of the TCP control block. This handle is opaque to the miniport driver 70. A LowerContext handle, on the other hand, is used to uniquely identify the connection to the miniport driver 70 and/or INIC/CPD 30. This handle is opaque to the host stack 44, and implementation specific to the miniport driver 70. Both the HostContext handle and LowerContext handle are contained in the TCP_OFFLOAD_COMMAND structure, while only the HostContext value is contained in the TCP_OFFLOAD_FRAME structure. During a connection handout, the host stack 44 passes down the HostContext field to the miniport driver 70. The miniport driver 70 returns the LowerContext on completing the handout request.

The protocol processing stack 44 on the host has responsibility for deciding when a connection is to be handed out to the INIC/CPD 30. A connection can be handed out to the INIC/CPD 30 as soon as the connection is fully established and any outstanding exceptions have been handled. Nevertheless, the protocol processing stack 44 may choose to not hand out a connection for a variety of reasons. For example, in order to preserve resources on the INIC/CPD 30, the host stack 44 may choose to not handout out slow connections, such as those employing Telnet. The host stack 44 may also use an heuristic method to determine that a particular connection is too unreliable to warrant putting it in fast-path mode.

Figure 5:
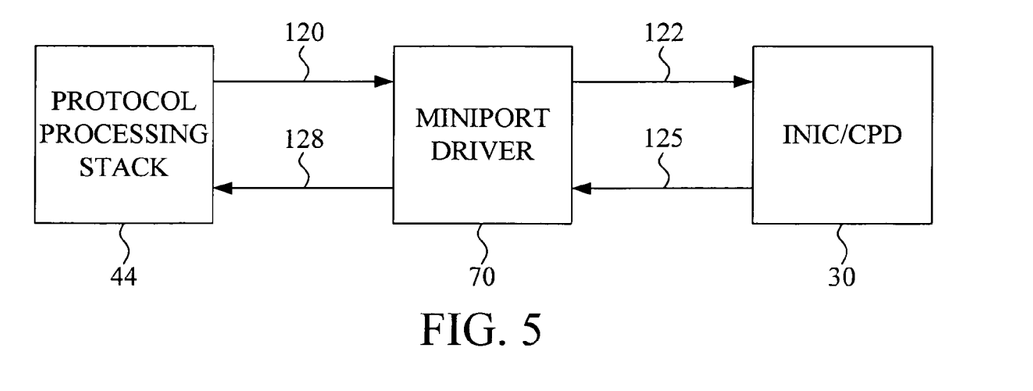
FIG. 5 shows a return of the connection context to the host protocol processing stack from the INIC/CPD via a miniport driver installed in the host.

Either the host protocol processing stack 44 or the INIC/CPD 30 can flush a connection, as shown in FIG. 5. Should the host stack 44 decide to flush a connection, it will issue a TCP_OFFLOAD_FLUSH 120 to the miniport driver 70, which in turn issues a Flush command 122 to the INIC/CPD 30, causing the INIC/CPD 30 to flush the connection. When the INIC/CPD 30 flushes the connection to the stack 44, several operations are performed that result in sending a Flush frame 125 to the miniport driver 70, which in turn sends a TCP_OFFLOAD_FRAME_FLUSH 128 to the INIC/CPD 30. For the situation in which the INIC/CPD 30 decides to flush the connection, the signals 120 and 122 do not exist.

When the INIC/CPD 30 flushes a connection, either by request from the host stack 44 or by its own decision, it performs several procedures. First, any outstanding fast-path send or receive message transfers are completed. When operating in the fast-path mode, a send or receive message transfer may involve 64 kilobytes of data, for example. When a send or receive transfer is terminated, information regarding the data sent or received is flushed to the host so that the stack 44 can continue processing the send or receive operation. In order to do this, the scatter gather list defining the set of host buffer address and length pairs for the send or receive message transfer is passed back to the stack 44, along with information denoting how much data has already been transferred via the fast-path. Second, the contents of the CCB defining the fast-path connection are also sent from the INIC/CPD 30 back to the host. Note that while a connection is in the fast-path mode, the state of the connection is maintained by the INIC/CPD 30. This connection state is transferred back to the host so that sequence numbers, etc, are kept in sync. The INIC/CPD 30 does not issue the flush frame to the host stack 44 until both of these steps are complete.

A connection may be flushed for a variety of reasons. For example, the stack 44 will flush if it receives a TDI_DISCONNECT instruction for the connection, as connection setup and breakdown occurs on the host stack. The INIC/CPD 30 will flush if it encounters a condition that is not allocated to the INIC/CPD for handling, such as expiration of a retransmission timer or receipt of a fragmented TCP segment.

Figure 6:
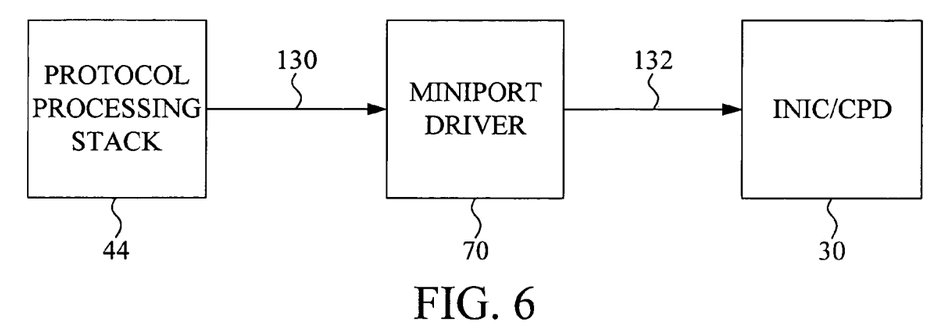
FIG. 6 diagrams a control mechanism for transmitting a message via the fast-path.

FIG. 6 diagrams a control mechanism for transmitting a message via the fast-path, which may be initiated by the protocol processing stack 44 receiving a TDI_SEND request for a connection that is in the fast-path mode. The steps for controlling this fast-path send of the message to a remote host via the INIC/CPD 30 are simple. The stack 44 creates a TCP_OFFLOAD_COMMAND with the appropriate context handles, the length of the message to be sent, and a scatter-gather list or send MDL. A virtual to physical address translation is performed by the host stack 44, although this translation may alternatively be performed by the miniport driver 70. The fast-path send command will not complete until either all of the data has been sent and acknowledged, or the connection has been flushed back to the host. If the connection is flushed back to the host, a residual field will indicate how much of the send MDL remains to be sent.

Figure 7:
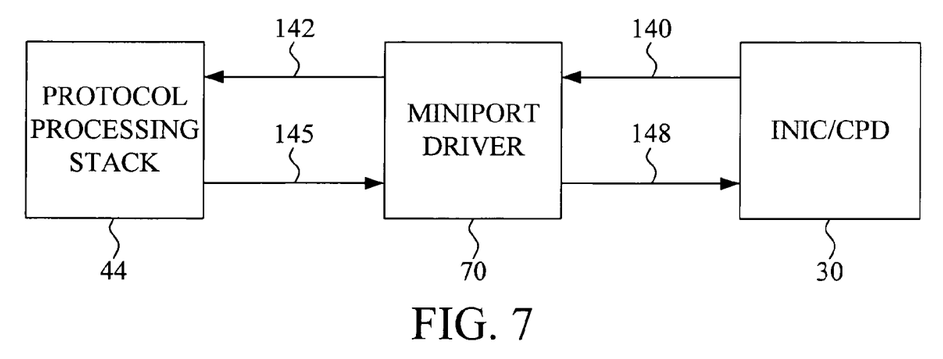
FIG. 7 diagrams a control mechanism for receiving a message via the fast-path.

A fast-path receive operation begins when a frame arrives on the INIC/CPD 30 for a connection on which no outstanding receive operation is already in progress. As shown in FIG. 7, when such a frame is received by the INIC/CPD 30, some or all of the received frame (depending on the frame size) is forwarded 140 to the miniport driver 70, which in turn sends 142 a TCP_OFFLOAD_FRAME_DATA frame containing the forwarded information to the host stack 44. The host stack 44 will in turn communicate with the upper layer interface, which may be a TDI interface for Microsoft systems, calling a receive handler registered by the upper layer or application. The amount of data in the received message frame may be indicated to that host application at this point, which may be termed an indicated length. That frame may also indicate the size of the data for the entire received message, so that a destination for that data can be earmarked within the host, such as with a scatter-gather list. A total message length that may be specified in an initial frame header is termed an available length.

For example, a NETBIOS message denotes the size of the data in the NETBIOS header, which can optionally be processed by the INIC/CPD 30 and passed to the upper layer interface for earmarking a final host destination in which to place the message data. Alternatively, the host stack 44 can process an initial NETBIOS header and learn how much more data is expected for the NETBIOS request. In cases for which a total message is size is unknown, a fictitious indication of large message length can be communicated to the upper layer interface, causing the application to respond with a large set of destination addresses which should have sufficient storage for the message.

Continuing with the example of a Microsoft operating system, if the available length is larger than the indicated length, the TDI upper layer or application will provide an I/O request packet (IRP) with an MDL. This MDL is passed down to the miniport driver 70 in the form of a TCP_OFF-LOAD_RCVMDL command, which forwards the command to the INIC/CPD 30. Like the fast-path send command, this command contains the context handles, the length of the receive MDL, and the scatter-gather list contained in the MDL. By passing the MDL directly to the INIC/CPD 30, the message data is moved directly to the buffer(s) provided by the TDI upper layer or application, without the data being touched by the CPU.

Subsequent message frames for this connection will be processed solely by the INIC/CPD 30 and moved into the buffers denoted by the MDL until either the MDL is filled or the command is flushed back to the host. If the command is flushed back to the host stack 44, then the residual field will indicate how much unprocessed data remains for the MDL. If the TCP_OFFLOAD_RCVMDL command is completed without error, then the Tcpip driver will complete the IRP, at which point the system is ready for the next TCP_OFF-LOAD_FRAME_DATA indication. For messages whose total size is not discernable from initial received frames, the connection may receive a FIN before the receive MDL is filled. If this occurs a short completion is performed on the receive IRP.

If the INIC/CPD 30 has been given a host destination such as a scatter-gather list or MDL by an upper layer or application, the INIC/CPD will treat data placed in this destination as being accepted by the upper layer or application. The INIC/CPD 30 may therefore ACK incoming data as it is filling the destination buffer(s) and will keep its advertised receive window fully open.

For small requests, however, there may be no MDL returned by the upper layer interface such as TDI to the INIC/CPD 30. In this case all of the data may be absorbed directly in the receive callback function. To account for this, the data which has been accepted by the application is updated to the INIC/CPD 30 so that the INIC/CPD can update its receive window. In order to do this, the host stack 44 can accumulate a count of data which has been accepted by the application receive callback function for a connection. From the INIC/CPD's point of view, though, segments sent to the host destination seem to be just "thrown over the wall" unless there is an explicit reply path. To correct this deficiency, the update may be piggybacked on requests sent to the INIC/CPD 30, for example via a field in the TCP_OFFLOAD_COMMAND structure. To deal with a scenario in which the data stream is entirely one-way, we can also define a TCP_OFF-LOAD_WINUPDATE command type to update the INIC/CPD.

A converse issue with offloading TCP processing involves keeping host stack 44 TCP/IP statistics up to date. For example, there is no conventional way for the host stack 44 to know how many TCP segments were received by the INIC/CPD 30. We address this issue by introducing a GET_TCP_STATISTICS OID, which is passed to the miniport driver 70 to obtain the TCP statistics. The way that the miniport and INIC/CPD 30 maintain these statistics depends upon implementations selected for those systems.

The host stack 44 creates and maintains a performance monitor (Perfmon) extension dynamic link library (DLL), which can be used to monitor fast-path statistics such as the following: 1) Fast-path/slow-path send/receive bytes per second; 2) Fast-path/slow-path send/receive segments per second; 3) Handouts per second; 4) Flushes per second; and 5) Fast-path/slow-path current connections.

Approximately 2500 lines of code are employed to port the fast-path modifications to the Microsoft host stack 44, not including comments. The approximate breakdown of this is as follows: 1) Connection handout—550 lines of code; 2) Flush—400 lines of code; 3) Send—550 lines of code; 4) Receive—600 lines of code; and 5) Miscellaneous (e.g., stats. and perfmon)—250 lines of code.

The fast-path code is implemented in such a way that it requires minimal changes to the existing TCP/IP host stack 44. Nearly all of the approximately 2500 lines of code are contained within fast-path specific routines, which are in turn kept in a single fast-path specific file. A number of changes to a Microsoft host stack 44 operation provide the appropriate calls into the fast-path code. These changes are summarized below.

The initialization code queries the adapters for the fast-path TCP_TASK_OFFLOAD feature and sets the appropriate information in the structure representing the adapter. Modifications to the TDI data presentation code are employed to indicate data received. Modifications are also employed where the host stack 44 receives a TDI Send request. The modified stack 44 then recognizes that a connection is in fast-path mode and calls the fast-path send routine.

After a TCP connection is set up, the host stack 44 checks the capabilities of the adapter associated with the connection, and if appropriate calls the fast-path connection handout routine. Similarly, for a fast-path connection that has been placed into slow-path mode, the host stack code repeats the handout of the connection once the connection returns to a standard state.

The ProtocolReceivePacket routine of the host stack 44 is modified to identify the existence of fast-path TCP_TASK_OFFLOAD information in the packet. If fast-path information exists, the appropriate fast-path receive routine is called.

The ProtocolSendComplete routine of the host stack 44 recognizes the completion of a fast-path send, and calls the appropriate fast-path send completion routine.

The TCP input code recognizes when it has received a slow-path frame on a fast-path connection, which indicates a routing loop. If this occurs the host stack 44 implements the flush code.

The TCP connection breakdown code recognizes when a connection is in fast path mode and issues a flush before closing the connection.

Paper Appendix A provides source code, written in a C-type language, defining the TCP_TASK_OFFLOAD structures used to implement the fast-path task offload.

CD Appendix A contains a hardware description language (verilog code) description of an embodiment of a receive sequencer of a network interface device.

CD Appendix B contains microcode executable by a processor on the network interface device. The processor operates in conjunction with the receive sequencer of CD Appendix A.

CD Appendix C contains a device driver executable on the host as well as an ATCP stack executable on the host. The software of CD Appendix C operates in conjunction with the network interface device of CD Appendices A and B.

Although we have focused in this document and the accompanying drawings on teaching the preferred embodiment, other embodiments and modifications will become apparent to persons of ordinary skill in the art in view of this teaching. Therefore, this invention is to be limited only by the following claims, which include all such embodiments and modifications when viewed in conjunction with the specification and accompanying drawings.

---

Paper Appendix A

```
/*
 ************************************************************************
 * This file defines structures and constants used for communication
 * between a TCP driver and a miniport driver for an intelligent
 * network card for TCP fastpath offload.
 ************************************************************************
 */
#if !defined(___TCP_OFFLOAD___H___)
#define ___TCP_OFFLOAD___H___
/*
 * Definitions for types of MEDIA_SPECIFIC_INFO. These are intended
 * to not clash with the enum values defined in ndis.h
 * Eventually these should become public members of that enum.
 */
#define TCP_OFFLOAD_CHECKSUM_ID     0x1000
#define TCP_OFFLOAD_COMMAND_ID      0x1001
#define TCP_OFFLOAD_FRAME_ID        0x1002
/*
 * Structure passed as MEDIA_SPECIFIC_INFO carrying info about
 * checksum offload.
 * This may be replaced with the official NT5 method when
 * this becomes available.
 */
typedef struct _TCP_OFFLOAD_CHECKSUM {
    BOOLEAN            DoIpChecksum;
    BOOLEAN            DoTcpChecksum;
    ULONG              HeaderLength;
    ULONG              TcpLength;         /* TCP payload size */
    USHORT             IpCsum;            /* Debug verification only
*/
    USHORT             TcpCsum;           /* Debug verification only
*/
} TCP_OFFLOAD_CHECKSUM, *PTCP_OFFLOAD_CHECKSUM;
/*
 * In the current implementation we are doing physical address
 * translation of fastpath MDLs at the TCP driver level.
 *
 * Note that in other versions, such as those integrated with NT5,
 * we may simply pass the MDL address and have the
 * lower-level driver do the translation
 *
 * We need to be able to pass a TDI_SEND consisting of a
 * NETBIOS header plus 64K of data; the latter may not be
 * page aligned.
 * XXX this definition should really depend on PAGE_SIZE,
 * but for the moment we are on X86 where this is known to be 4K.
 */
#define TCP_OFFLOAD_MAXSG      20
/*
 * For outgoing data, we don't want individual DMAs for very
 * small buffer elements (in particular, note that the 4-byte netbios
 * header always appears in its own separate buffer), so we will
 * pass data elements of 4 bytes or less directly in the command.
 * We define a custom scatter/gather element to allow this.
 * XXX this could be compressed somewhat as a union, but would
 * be less legible . . .
 */
typedef struct _TCP_OFFLOAD_SG {
    ULONG                   Length;
    NDIS_PHYSICAL_ADDRESS   PhysicalAddress;
    ULONG                   InlineLength;
    UCHAR                   InlineData[4];
} TCP_OFFLOAD_SG, *PTCP_OFFLOAD_SG;
/*
 * Structure passed as MEDIA_SPECIFIC_INFO carrying info about
 * fastpath commands.
```

-continued

Paper Appendix A

```
*/
typedef struct _TCP_OFFLOAD_COMMAND {
    ULONG           CommandCode;        /* Handout, Send, etc */
    PVOID           CommandContext;     /* Identifies cmd at TCP
                                           level*/
    ULONG           HostContext;        /* Host Context Handle */
    ULONG           LowerContext;       /* Miniport context handle */
    ULONG           Status;             /* On return */
    union {
        struct _TCP_HANDOUTINFO {
            ULONG           SrcIpAddr;      /* Initial handout */
            ULONG           DstIpAddr;      /* Initial handout */
            USHORT          SrcPort;        /* Initial handout */
            USHORT          DstPort;        /* Initial handout */
            UCHAR           MacAddr[6];     /* Generalize later */
        } Handout;
        PVOID           TcbAddr;            /* 2nd-half handout */
        struct _TCP_DATACOMMAND {
            ULONG           WindowUpdate;   /* May be 0 */
            ULONG           TotalLength;    /* Send & Rcv */
            ULONG           Resid;          /* flush return */
            ULONG           Flags;
            ULONG           NumAddrUnits;   /* # S/G entries*/
            TCP_OFFLOAD_SG  AddrList[TCP_OFFLOAD_MAXSG];
        } DataCommand;
    } command_u;
} TCP_OFFLOAD_COMMAND, *PTCP_OFFLOAD_COMMAND;
/*
 * Command codes
 */
#define TCP_OFFLOAD_HANDOUT1        0
#define TCP_OFFLOAD_HANDOUT2        1
#define TCP_OFFLOAD_SENDMDL         2
#define TCP_OFFLOAD_RCVMDL          3
#define TCP_OFFLOAD_WINUPDATE       4
#define TCP_OFFLOAD_FLUSH           5
#define TCP_OFFLOAD_CLOSE           6
/*
 * Status codes.
 */
#define TCP_OFFLOADCMD_SUCCESS          0
#define TCP_OFFLOADCMD_NOCONTEXT        1
#define TCP_OFFLOADCMD_STALECONTEXT     2
#define TCP_OFFLOADCMD_FLUSH            3
#define TCP_OFFLOADCMD_FAIL             4
/*
 * Data command flags.
 */
#define TCP_OFFLOAD_FORCEACK 1 /* Force ACK on RCV MDL completion */
/*
 * Structure passed as MEDIA_SPECIFIC_INFO carrying info about
 * fastpath input frames.
 */
typedef struct _TCP_OFFLOAD_FRAME {
    USHORT          FrameType;          /* Data, flush, etc */
    USHORT          Flags;              /* PUSH etc */
    ULONG           HostContext;        /* Fastpath connection cookie */
    union {
        struct _FPDATAFRAME {
            ULONG           AvailableLen;   /* For indication */
            PVOID           Payload;        /* Actual data */
            USHORT          PayloadLen;     /* Length of this */
            USHORT          IpId;           /* debug purposes */
        } DataFrame;
        USHORT          FlushReasonCode;    /* For flush frames */
    } frame_u;
} TCP_OFFLOAD_FRAME, *PTCP_OFFLOAD_FRAME;
/*
 * Frame types
 */
#define TCP_OFFLOAD_FRAME_INTERLOCK     0x0000   /* Handout handshake */
#define TCP_OFFLOAD_FRAME_DATA          0x0001   /* Data frame */
#define TCP_OFFLOAD_FRAME_FLUSH         0x0002   /* Flush frame */
/*
 * Frame flags; only 1 defined at present.
 */
#define TCP_OFFLOAD_FRAME_PUSHFLAG      0x0001   /* Rcv'd frame had
```

-continued

Paper Appendix A

```
PSH*/
/*
 * Definitions for the size of these various types of tcp offload
 * structures contained within a MEDIA_SPECIFIC_INFORMATION
 * structure (and therefore including the size of this up to
 * the ClassInformation[] field, since the TCP_OFFLOAD
 * structures are actually contained within the ClassInformation[]
 * array.)
 */
#define TCP_OFFLOAD_CHECKSUM_INFOSIZE                           \
    (sizeof (TCP_OFFLOAD_CHECKSUM) +                            \
  FIELD_OFFSET(MEDIA_SPECIFIC_INFORMATION, ClassInformation))
#define TCP_OFFLOAD_COMMAND_INFOSIZE                            \
    (sizeof (TCP_OFFLOAD_COMMAND) +                             \
  FIELD_OFFSET(MEDIA_SPECIFIC_INFORMATION, ClassInformation))
#define TCP_OFFLOAD_FRAME_INFOSIZE                              \
    (sizeof (TCP_OFFLOAD_FRAME) +                               \
  FIELD_OFFSET(MEDIA_SPECIFIC_INFORMATION, ClassInformation))
#endif /* ___TCP_OFFLOAD___H___*/
```

The invention claimed is:

1. A method for receiving data from a network by a local host having a processor running an application and a memory that is accessible by the processor, the local host being connected to the network by a network interface, the data prepended with a TCP header, the method comprising:
identifying, by the application, a location in the memory to place the data;
providing a description of the location to the network interface; and
placing, by the network interface, the data free of the TCP header into the memory at the location.

2. The method of claim 1, wherein the application includes a file server protocol.

3. The method of claim 1, wherein providing a description of the location to the network interface includes providing a buffer to the network interface.

4. The method of claim 1, wherein providing a description of the location to the network interface includes providing a list of host buffer address and length pairs to the network interface.

5. The method of claim 1, wherein providing a description of the location to the network interface includes providing a memory descriptor list (MDL) to the network interface.

6. The method of claim 1, further comprising sending, by the network interface, an acknowledgment (ACK) to the remote host to acknowledge receipt of the data, while placing the data into the memory.

7. The method of claim 1, further comprising sending, by the network interface, a window update to the remote host to signal acceptance of the data by the application, after placing the data into the memory.

8. The method of claim 1, wherein the data is placed into the memory without the data being touched by the processor.

9. The method of claim 1, further comprising:
establishing, by the processor, a TCP connection corresponding to the TCP header; and
offloading the TCP connection to the network interface.

10. The method of claim 1, wherein the network interface includes a device driver for a network interface device, and wherein providing a description of the location to the network interface includes providing a data structure to the device driver.

11. The method of claim 1, wherein the data is part of a message received in a plurality of packets, and identifying a location in the memory to place the data includes allocating sufficient space in the memory to store the message.

12. A method for receiving a message from a network by a local host having a processor running an application and a memory that is accessible by the processor, the local host being connected to the network by a network interface, the message including a plurality of packets each having a TCP header, the method comprising:
identifying, by an application of the local host, a destination in the memory to place the data;
providing a description of the destination to the network interface; and
placing, by the network interface, data from each packet free of any TCP header into the memory at the destination.

13. The method of claim 12, wherein providing a description of the destination to the network interface includes providing a buffer to the network interface.

14. The method of claim 12, wherein providing a description of the destination to the network interface includes providing a list of host buffer address and length pairs to the network interface.

15. The method of claim 12, wherein providing a description of the destination to the network interface includes providing a memory descriptor list (MDL) to the network interface.

16. The method of claim 12, further comprising sending, by the network interface, ACKs back to the remote host to acknowledge receipt of the data, while placing the data into the memory.

17. The method of claim 12, further comprising sending, by the network interface, a window update to the remote host to acknowledge acceptance of the data by the application, after placing the data into the memory.

18. The method of claim 12, wherein the data is placed into the destination without the data being touched by the processor.

19. A system for receiving data from a network by a local host having a processor running an application and a memory that is accessible by the processor, the local host connected to the network by a network interface, the data prepended with a TCP header, the system comprising:

an application running on the processor to identify a location in the memory in which to place the data, and to create a data structure that provides a description of the location; and a mechanism of the network interface that uses the data structure to place the data free of the TCP header into the memory at the location.

20. The system of claim 19, wherein the description includes a buffer of the memory.

21. The system of claim 19, wherein the data structure includes a scatter-gather list of host buffer address and length pairs.

22. The system of claim 19, wherein the data structure includes a memory descriptor list (MDL).

23. The system of claim 19, wherein the mechanism includes a direct memory access (DMA) engine.

24. The system of claim 19, further comprising:

a protocol processing stack that is executable by the processor to establish a TCP connection corresponding to the TCP header and to offload the TCP connection to the network interface.

25. The system of claim 19, wherein the network interface includes a device driver for a network interface device, and the data structure that provides a description of the location to the network interface is passed from the device driver to the network interface device.

* * * * *